# (12) United States Patent
Konosu et al.

(10) Patent No.: US 8,419,338 B2
(45) Date of Patent: Apr. 16, 2013

(54) WORK CONVEYING APPARATUS

(75) Inventors: Hitoshi Konosu, Nagoya (JP); Tadashi Odashima, Owariasahi (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 672 days.

(21) Appl. No.: 12/665,212

(22) PCT Filed: Jul. 25, 2008

(86) PCT No.: PCT/JP2008/063826
§ 371 (c)(1),
(2), (4) Date: Dec. 17, 2009

(87) PCT Pub. No.: WO2009/017214
PCT Pub. Date: Feb. 5, 2009

(65) Prior Publication Data
US 2010/0183414 A1 Jul. 22, 2010

(30) Foreign Application Priority Data
Jul. 30, 2007 (JP) ................................ 2007-197928

(51) Int. Cl.
*B25J 17/00* (2006.01)
(52) U.S. Cl.
USPC ........... 414/590; 74/490.01; 212/292; 901/15
(58) Field of Classification Search .................. 414/680, 414/591, 590, 589; 901/16, 15; 74/490.01; 212/328, 292, 71; 269/559, 22
See application file for complete search history.

(56) References Cited

U.S. PATENT DOCUMENTS

| | | | |
|---|---|---|---|
| 4,466,506 A | * | 8/1984 | Dolenti .......................... 182/2.1 |
| 4,775,289 A | | 10/1988 | Kazerooni |
| 5,107,709 A | | 4/1992 | McCarty |
| 5,107,719 A | | 4/1992 | Kota |
| 5,890,396 A | | 4/1999 | Kaneko et al. |

FOREIGN PATENT DOCUMENTS

| | | |
|---|---|---|
| CN | 1919545 A | 2/2007 |
| DE | 10 2005 055678 A1 | 4/2007 |
| EP | 0 658 403 A1 | 6/1995 |
| EP | 2 172 313 A1 | 4/2010 |
| JP | 63-284072 A | 11/1988 |

(Continued)

OTHER PUBLICATIONS

Office Action issued Sep. 21, 2011 in Canadian Application No. 2,692,825.

*Primary Examiner* — Donald Underwood
(74) *Attorney, Agent, or Firm* — Kenyon & Kenyon LLP (57) ABSTRACT

Since both a driving means for lifting a work and a driving means for turning operation must have been arranged in a conventional work transfer apparatus, the apparatus has been large in size and heavy in weight. A work transfer apparatus is provided with a holding tool for holding a window, i.e., the work, and a supporting arm for movably supporting the holding tool. The window held by the holding tool is transferred by a supporting arm to window frames to which the window is to be assembled, and the posture of the window is changed to that corresponds to the window frames. Furthermore, the supporting arm is configured to be a closed loop link mechanism wherein a plurality of links are connected to form a closed loop. The posture of the holding tool one link of a pair of links connected to the holding tool of the supporting arm can be fixed.

2 Claims, 7 Drawing Sheets

FOREIGN PATENT DOCUMENTS

| | | |
|---|---|---|
| JP | 04-189493 A | 7/1992 |
| JP | 07-137675 A | 5/1995 |
| JP | 08-080880 A | 3/1996 |
| JP | 10 146781 A | 6/1998 |
| JP | 11-245124 A | 9/1999 |
| JP | 2003-311663 A | 11/2003 |
| SU | 1 627 401 A1 | 2/1991 |

* cited by examiner

FIG. 1

← Transfer Direction of Vehicle

FIG. 2

← Transfer Direction of Vehicle

FIG. 3

Transfer Direction of Vehicle

Transfer Direction of Vehicle ←

FIG. 9

WORK CONVEYING APPARATUS

This is a 371 national phase application of PCT/JP2008/063826 filed 25 Jul. 2008, claiming priority to Japanese Patent Application No. 2007-197928 filed 30 Jul. 2007, the contents of which are incorporated herein by reference.

FIELD OF THE INVENTION

The present invention relates to a work conveying apparatus, holding a work, conveying the work to a work-assembly position, and changing the posture of the work corresponding to the work-assembly position.

BACKGROUND OF THE INVENTION

Conventionally, in the assembly line of a vehicle, when a work is assembled to the vehicle, which is difficult for an operator to transfer, set, or assemble (called "a large work" involving a front window or a rear window), a work conveying apparatus is used, which assists to support the work, reduces the load to support the work for the operator, and which assists to convey the work, reduces the load to operate the work. Thus, work conveying apparatus is known as a power assist apparatus.

As the work conveying apparatus, JP-A-11-245124 discloses the work lifting apparatus including a holder and a supporter, the holder holds the work, the supporter moves the holder vertically and supports to the holder with inclination. This work lifting apparatus detects the inclination of the holder operated by the operator and lifts the holder by the supporter on the detected direction and angle about the inclination of the work.

The lifting of the holder is achieved, for example, by a driver of the supporter, which moves the supporter telescopically, and the supporter lifts the holder.

Typically, the work conveying apparatus conveys the work to the position where the work is assembled to the body, and then the work is assembled to the body. For example, as the holder is inclined to the supporter, the posture of the work can be turned in accordance with the position.

The work lifting apparatus includes a driver involving a motor, the driver rotates the holder to the supporter, and the work can be inclined in accordance with that of the body.

Thus, the work lifting apparatus disclosed JP-A-11-245124 includes two independent drivers for lifting and rotating the work.

In the work lifting apparatus, for example, when the window as the work is assembled to the window frame of the vehicle as the body, the holder holding the work is moved down by the driver for lifting, and rotated by the driver for rotating, and inclined in accordance with the inclination of the window frame.

In this case, the rotating of the window is needed to finish during the desired time on tact time of the assembly line, when the heavy article such as the front window or the rear window ("the large work") is rotated by the desired angle during the desired time, the rotating driver tends to be large and heavy.

Furthermore, the lifting driver needs to lift rotating driver as well as the holder and the work. Thus, if the rotating driver is large and heavy, the lifting driver is needed to have the large capacity of lifting, so that the work lifting apparatus should become large and heavy.

The purpose of the invention is to provide a new work conveying apparatus, which is constructed to be small and light.

SUMMARY OF THE INVENTION

A work conveying apparatus of the first aspect of the present invention, includes a holder holding the work and a support arm supporting and conveying the holder to the work-assembly position, in which the support arm is constructed as a quadrate closed loop link mechanism connected by plural links, in which the holder is connected by a pair of the links in the plural links, and in which the posture of the holder against the one link in the pair of the links is fixed.

Due to the above structure, the work conveying apparatus may only include the driving means for lifting the work without the driving means for rotating it, the driving means for rotating is dispensed, so that the weight supported by the arm is lightened, the driving means for lifting the work can be downsized and lightened and altogether the work conveying apparatus can be downsized and lightened.

In the work conveying apparatus of the present invention, the support arm preferably includes a joint member connecting the pair of the links and the holder rotatably; and a connect member connecting selectively the holder to either the link without relative rotation for fixing the posture of the link.

Due to the above structure, the holder can be easily and surely fixed the posture against the one link in the pair of the links.

In the work conveying apparatus of the present invention, the holder preferably includes a drive member for fine tuning the posture of the link.

Due to the above structure, the accuracy for tuning the posture of the work and the quality for assembling the work to the body can be improved.

As mentioned above, according to the present invention, the work conveying apparatus dispenses the driving means for rotating is dispensed, so that the weight supported by the arm is lightened, the driving means for lifting the work can be downsized and lightened and altogether the work conveying apparatus can be downsized and lightened.

DETAILED DESCRIPTION OF THE INVENTION

A work conveying apparatus 1 conveys, positions and assembles a work to the given position three-dimensionally, with intended by a worker, in concert with the worker or by itself. The work is difficult for the operator to transfer, set, or assemble (called "a large work" involving a front window or a rear window).

Figure 1:
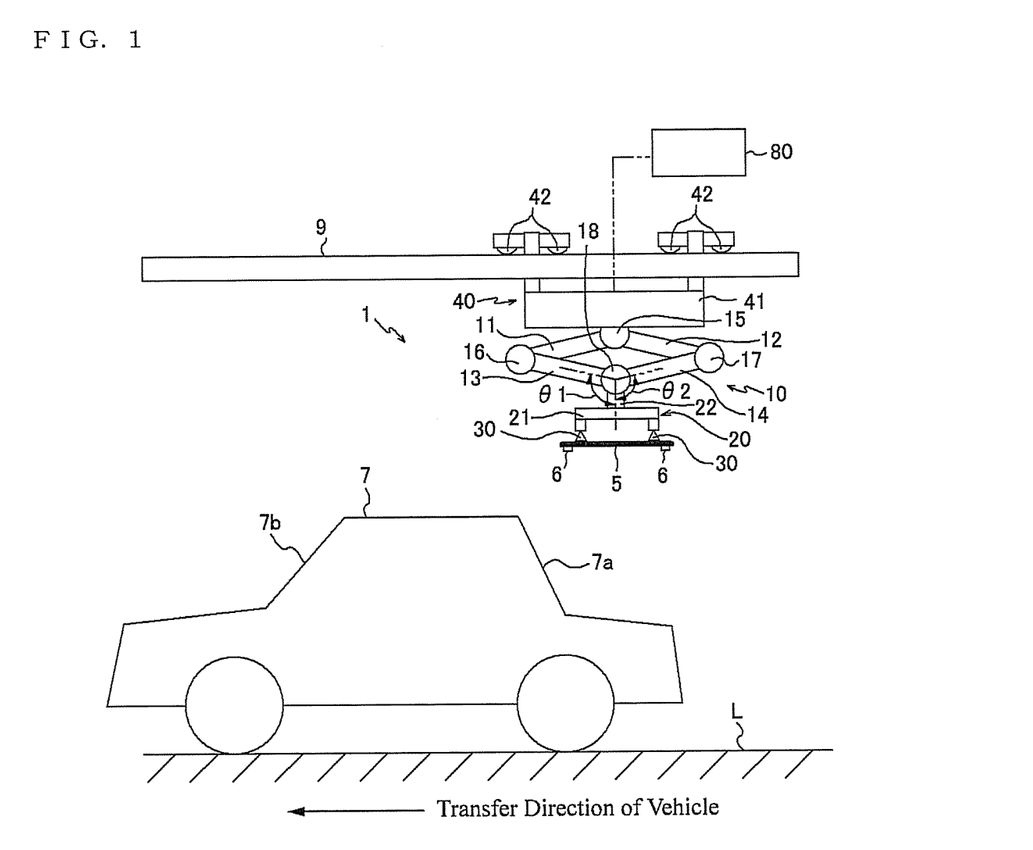
FIG. 1 is a side view showing a work conveying apparatus with a support arm shortening vertical length.

The work conveying apparatus 1 positions and assembles a window 5 as the work to a rear window frame 7a or a front window frame 7b of a vehicle 7, which is transferred to the left along an assembly line L shown in FIG. 1. The work conveying apparatus 1 includes a holder 20, a supporting arm 10, an overhead trolley 40 and a controller 80. The holder 20 holds the window 5. The arm 10 three-dimensionally supports the holder 20. The trolley 40 is disposed above the arm 10, and supports and transfers the arm 10 along the parallel direction of the assembly line L. The controller 80 controls the arm 10 and so on.

The work conveying apparatus 1 positions and assembles the window 5 to the rear window frame 7a and the front window frame 7b of the vehicle 7, but it may be applied to apparatuses which assembles the other window involving a side window, the other parts involving a bonnet or the like.

The trolley 40 includes a main body 41, wheels 42. The wheels 42 are set to the body 41, and engaged to a rail 9, which is laid down in the transfer direction of the assembly line L. The wheels 42 are engaged to the rail 9, so that the trolley 40 is supported by the rail 9.

Thus, the trolley 40 is supported by the rail 9 and travels along the rail 9 (along the transfer direction of the assembly line L).

The arm 10 is constructed a quadrate closed loop link mechanism, which is connected by a first upper link 11, a second upper link 12, a first lower link 13 and a second lower link 14. The ends of the links 11 and 12 are connected by an upper joint 15, the joint 15 is supported by the body 41, the ends of the links 13 and 14 are connected by a lower joint 18, the ends of the links 11 and 13 are connected by a first middle joint 16, the ends of the links 12 and 14 are connected by a second middle joint 17.

The joint 15 is an active joint rotatably supporting the links 11 and 12 in the direction of the assembly line L, including motors, in which the one rotates the link 11 around the joint 15, the other rotates the link 12 around the joint 15.

An offset link 22 is connected to the joint 18 and is extended from a body 21 of the holder 20, and can be rotated around the joint 18 in the direction of the assembly line L.

The link 22 can fix the rotation angle (the position) selectively against the link 13 or 14, which are connected to the link 22.

The joint 16 is a passive joint rotatably supporting the links 11 and 13 in the direction of the assembly line L, and the joint 17 is a passive joint rotatably supporting the link 12 and 14 in the direction of the assembly line L.

The arm 10 is not especially limited to be configured as the closed quadrate loop mechanism connected by the four links, may be configured as a closed loop mechanism connected by the different numbers of the link. It may include a pair of the links connected to the link 22, such as the links 13 and 14 connected to the link 22 by the joint 18.

The holder 20 includes plural suction pads 30 (four pads) to hold the window 5, the pad 30 is disposed at the body 21 of the holder 20.

The number of the pads 30 is not especially limited to be four, which is the same number of the corners of the window 5. The holder 20 may include the three or more than four pads.

The controller 80 controls the motors disposed in the joint 15 for driving the arm 10, the switch either holding or releasing the window 5 by the pads 30 of the holder 20 and the like.

Due to the work conveying apparatus 1 configured as the above structure, the window 5 is assembled to the rear window frame 7a as following.

As shown in FIG. 1, keeping the holder 20 upper by the arm 10, when the holder 20 holds the window 5, the ends of which is coated with the adhesive, by the pads 30, the trolley 40 travels along the rail 9 and the window 5 is conveyed near the rear window frame 7a.

Actually, when the window 5 is conveyed to the vehicle 7, the arm 10 is rotated to shorten the vertical length (the links 11, 12 are driven to rotate in the direction in which the inner angles of both links become wide inside the closed link loop), so that the window 5 is kept upper.

The window 5 is held horizontally by the holder 20 in the upper.

When the window 5 is conveyed along the rail 9, the following structure for travelling the trolley may be adopted; for example, the trolley 40 travels along the rail 9 cooperated with the operation of the operator with handling the holder 20, and the trolley 40 travels along the rail 9 itself.

When the window 5 is conveyed to the rear window frame 7a of the vehicle 7, the arm 10 is rotated to extend the vertical length (the links 11, 12 are driven to rotate in the direction in which the inner angles of both links become narrow inside the closed link loop), so that the window 5 is moved down.

If the work conveying apparatus 1 assembles the window 5 to the rear window frame 7a, the rotation angle $\theta 1$ of the link 22 to the link 13 is fixed. The rotation angle $\theta 2$ of the link 22 to the link 14 is not fixed, so that the link 22 can rotate against the link 14.

Figure 2:
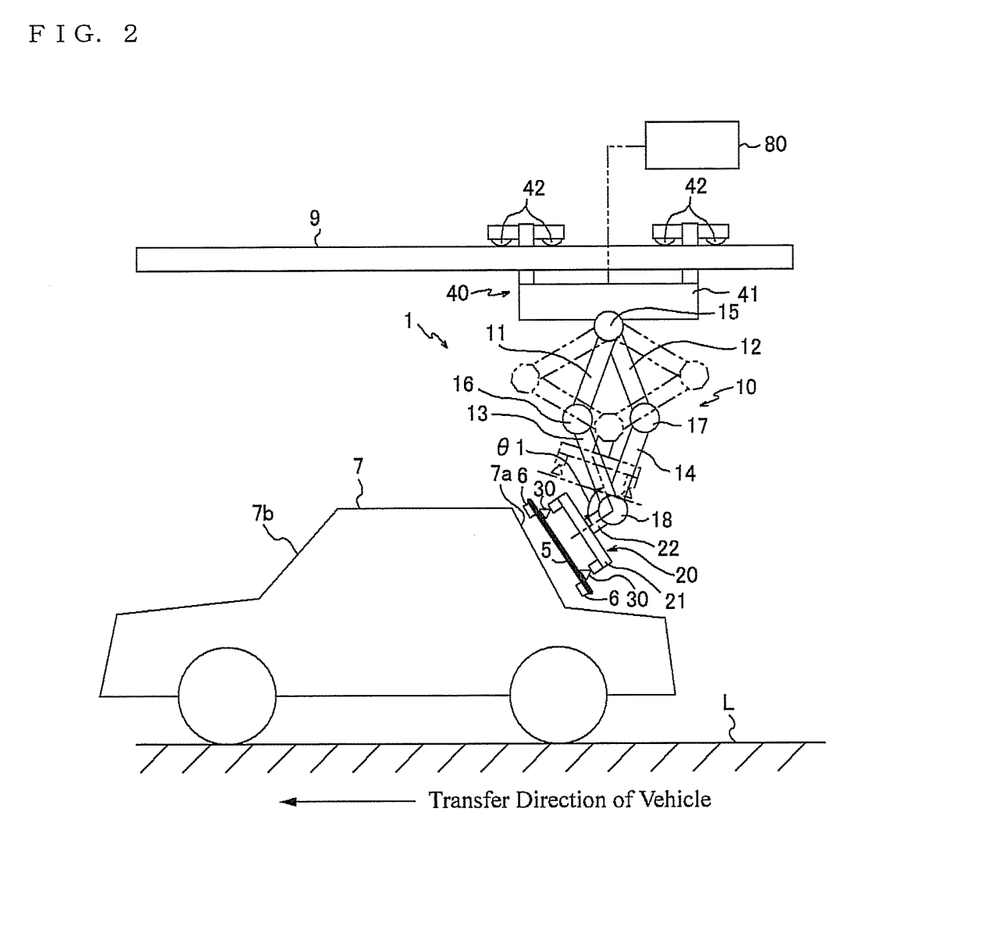
FIG. 2 is a side view showing the work conveying apparatus with the support arm extending the vertical length in the state the rotation angle of an offset link and a first lower link is fixed.

When the arm 10 is driven to extend the vertical length and the window 5 is moved down, as shown in FIG. 2, the posture of the links 11, 12, 13 and 14 of the arm 10 is turned from the horizontal posture to the vertical posture. The rotation angle $\theta 1$ to the link 13 is fixed, so that the window 5 is rotated rightward around the joint 18, which is held by the holder 20 connected to the offset link 22, and the window inclines leftward, in other word, the position of the left end of the window 5 is upper than that of the right end (see FIG. 2).

In this case, the window 5 is moved down to the height of the position of the rear window frame 7a, the rotation angle $\theta 1$ and the like are set, where the slope angle of the rear window frame 7a is substantially same as that of the window 5.

Thus, after the window 5 is moved down to the position of the rear window frame 7a, the window 5 is fitted to the rear window frame 7a by the operator.

Further, the window 5 is pressed to the rear window frame 7a and the adhesive 6, coated around the window 5, is pressed by the window 5 and the rear window frame 7a, the window 5 is assembled to the rear window frame 7a.

Figure 3:
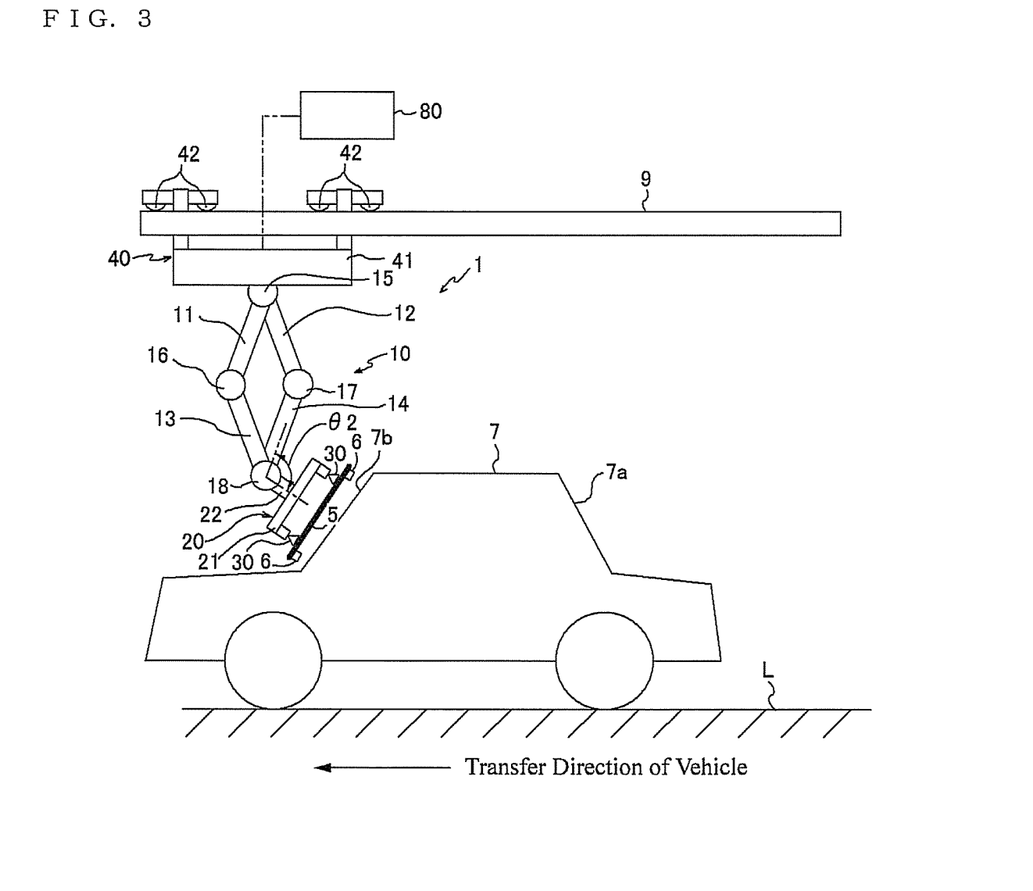
FIG. 3 is a side view showing the work conveying apparatus with the support arm extending the vertical length in the state the rotation angle of the offset link and a second lower link is fixed.

If the window 5 is assembled to the front window frame 7b, the arm 10 is driven to extend the vertical length, the window 5 is moved down, in this case, the rotation angle $\theta 1$ of the link 22 to the link 13 is not fixed, the rotation angle θ2 of the link 22 to the link 14 is fixed, so that the link 22 can be rotated around the link 13.

Thus, as shown in FIG. 3, the window 5 is moved down by the extending motion of the arm 10, is rotated leftward around the joint 18, inclines rightward, in other word, the position of the right end of the window 5 is upper than that of the right end.

In this case, the window 5 is moved down to the height of the position of the front window frame 7b, the rotation angle θ2 and the like are set, where the slope angle of the front window frame 7b is substantially same as the window 5.

Thus, the offset link 22 can be fixed in the rotation angle θ1 to the link 13 or in the rotation angle θ2 to the link 14, which are connected by the joint 18.

The structure capable of fixing the rotation angle θ1, θ2 will be described.

Figure 4:
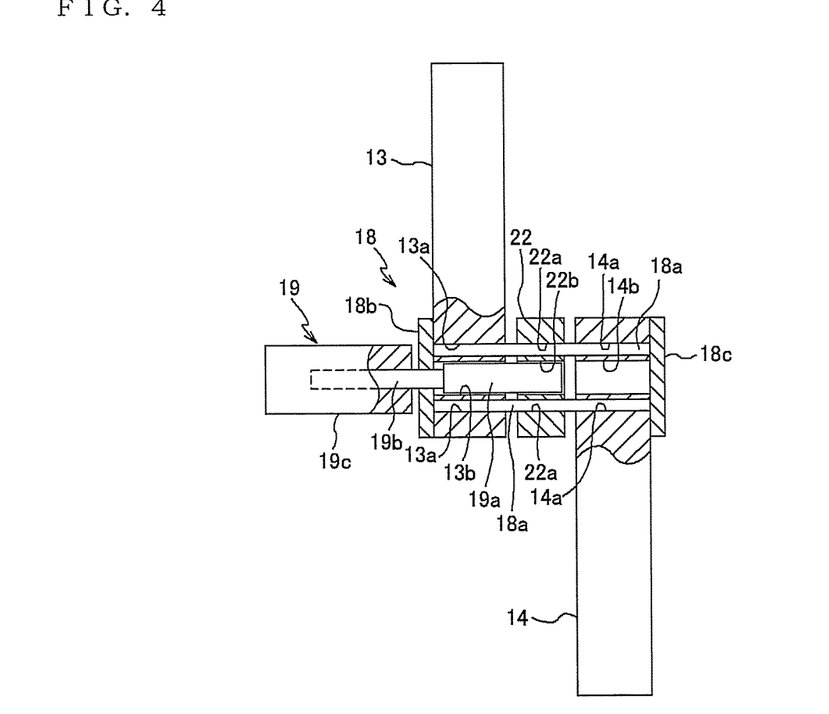
FIG. 4 is a ground section view showing the part of a lower joint in the support arm in the state that a piston for fixing the rotation angle is inserted in holes for switching the joint position of the first lower link and the offset link.
Figure 5:
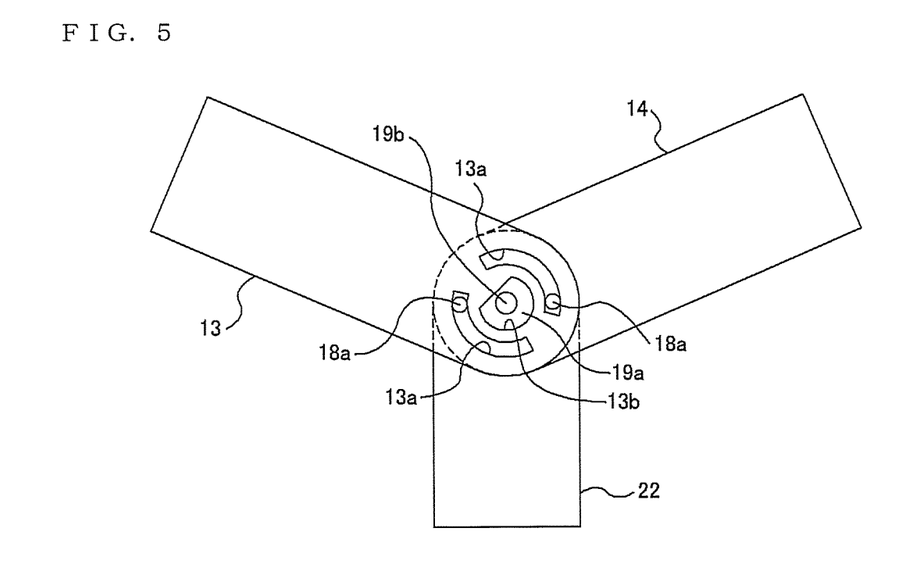
FIG. 5 is a side view showing the part of the lower joint in the support arm

As shown in FIGS. 4 and 5, the links 13, 14 and 22 are set, in the rotate center of the joint 18, the link 22 is arranged between the links 13 and 14. In the part of the links 13, 14 and 22 which are connected by the joint 18 (in the lower ends of the links 13, 14 and the upper end of the link 22), there are sleeves 13a, 13a, 14a, 14a, 22a and 22a formed arc with the desired width.

The sleeves 13a, 14a and 22a are formed, which go through the links 13, 14 and 22, respectively, in the direction of the rotate center axis of the joint 18.

The numbers of the sleeves 13a, 14a and 22a are not limited, in this embodiment, the two sleeves (13a, 13a, 14a, 14a, 22a and 22a) are formed.

Coupling shafts 18a are inserted to the sleeve 13a, 14a and 22a, the shafts 18a connect the links 13, 14 and 22 at the joint 18.

The shaft 18a can slide along the arc form as the sleeves 13a, 14a and 22a.

The links 13, 14 and 22 are connected rotatably around the center of the joint 18.

Thus, the shafts 18a serve as the coupling member connecting the links 13, 14 and 22 rotatably.

The both ends of the shaft 18a are fixed to stops 18b (at the side of the link 13) and 18c (at the side of the link 14).

Thus, the ends of the shafts 18a are set to the stops 18b, 18c, so that the shafts 18a can be prevented from pulling out the sleeves 13a, 14a and 22a and can fix the relative positions. The positions of the shafts 18a are fixed such that the each shaft 18a slides in the sleeves 13a, 14a and 22a as the same manner. The each position of the shaft 18a is set to the same phase in the sleeves 13a, 14a and 22a.

Holes 13b, 14b and 22b are formed to go through the links 13, 14 and 22 along the direction of the rotation axis, and formed inner than the shafts 18a inserted to the links 13, 14 and 22.

The holes 13b, 14b and 22b are formed as circles in which a part of the peripheral is cut straightly (hereinafter called "cut-circle") in section (see FIG. 5).

The joint 18 includes a fixing plunger 19. The plunger 19 includes a piston 19a, a pin 19b and a body 19c, the piston 19a is for fixing the rotation angle and is column which has the cut-circle sectional form to fit the holes 13b, 14b and 22b, the pin 19b extends from the end of the piston 19a, and the body 19c supports the pin 19b slidably along the axis direction.

The body 19c is fixed in the axis direction of the links 13, 14 and 22.

The piston 19a is constructed to change the position of the links 13, 14 and 22 in the axis direction by means of sliding the pin 19b in the body 19c.

The length of the piston 19a is designed such that the following condition (1) and (2) is satisfied. (1) The length is longer than the gap between the links 13 and 22, shorter than the total length of the gap and thickness of the links 13 and 14. (2) The length is longer than the gap between the links 14 and 22, shorter than the total length of the gap and thickness of the links 14 and 22.

Figure 6:
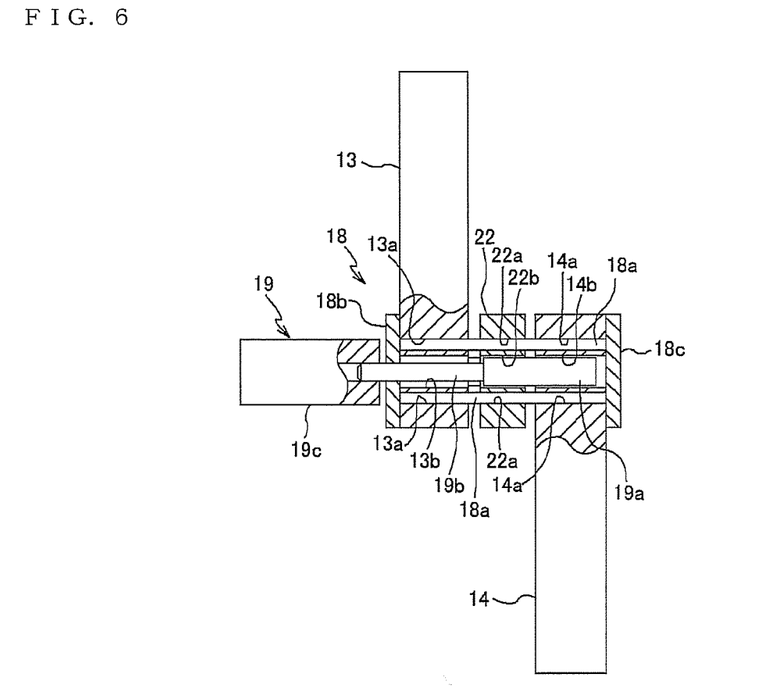
FIG. 6 is a ground section view showing the part of the lower joint in the support arm in the state that the piston is inserted in the holes for switching the joint position of the second lower link and the offset link.

Thus, according to the slide position of the pin 19b in the body 19c, the piston 19a can be set selectively, (1) in the position which the piston 19a is inserted to the holes 13b and 22b, the each end of the piston 19a does not protrude from the hole 13b, 22b (see FIG. 4), or (2) in the position which the piston 19a is inserted to the holes 14b and 22b, the end of the piston 19a does not protrude from the hole 14b, 22b (see FIG. 6).

In other words, the piston 19a can be switched, (1) in the position which the piston 19a is inserted in the holes 13b and 22b, and is not inserted in the hole 14b (see FIG. 4), or (2) in the position which the piston 19a is inserted in the holes 14b and 22b, and is not inserted in the hole 13b (see FIG. 6). The piston 19a serve as a member connecting selectively the holder 20 to either the link 13 or 14 without relative rotation for fixing the posture of the links.

The piston 19a has the cut-circle sectional form fitting to the holes 13b, 14b and 22b, if the piston 19a is inserted in the holes 13b, 14b and 22b, the piston 19a can not rotate around the holes 13b, 14b and 22b, so that the phase of the piston 19a is fixed to the holes 13b, 14b and 22b in the rotate direction.

Thus, (1) if the piston 19a is inserted in the holes 13b and 22b, the rotation angle θ1 of the link 22 to the link 13 is fixed, (2) if the piston 19a is inserted in the holes 14b and 22b, the rotation angle θ2 of the link 22 to the link 14 is fixed.

Furthermore, the controller 80 can control the slide position in the rotation axis direction of the piston 19a.

Due to the above construction, the work conveying apparatus 1 can selectively fixes the rotation angle θ1 of the link 22 to the link 13 or the rotation angle θ2 of the link 22 to the link 14, when the arm 20 is driven in the vertical extending direction and the window 5 is moved down, as shown in FIG. 2, if the inclining posture of the holder 20 is turned to the posture inclining leftward, the slide position of the piston 19a is controlled to fix the rotation angle θ1, and when the window 5 is moved down, as shown in FIG. 3, if the inclining posture of the holder 20 is turned to the posture inclining rightward, the sleeve position of the piston 19a is controlled to fix the rotation angle θ2.

Thus, in the work conveying apparatus 1, the rotation angle θ1 of the links 13 and 22, or the rotation angle θ2 of links 14, 22 can be selectively fixed, the inclining posture of the holder 20 automatically turns in concert with the arm 10, so that the means of driving may not be added which rotates the holder 20 (the window 5) to change the inclining posture.

Thus, the work conveying apparatus 1 may only include the driving means for lifting the work without the driving means for rotating it.

The driving means for rotating is dispensed, so that the weight supported by the arm 10 is lightened, the driving means for lifting the work (the motor disposed in the joint 15) can be downsized and lightened.

The mechanism includes the shafts 18a and the piston 19a, which can fix the posture of the holder against the link 13 or the link 14, the shafts 18a connect the links 13, 14 and 22 to rotate each other, the piston 19a selectively joints the link 13 or 14 to the holder 20 without rotating each other, so that the holder 20 can be easily and surely fixed the posture against the link 13 or 14.

In the alternative structure fixing the rotation angle θ1 and θ2, the angle of the link 22 to the link 13 or 14 can be fine tuned as following.

Figure 7:
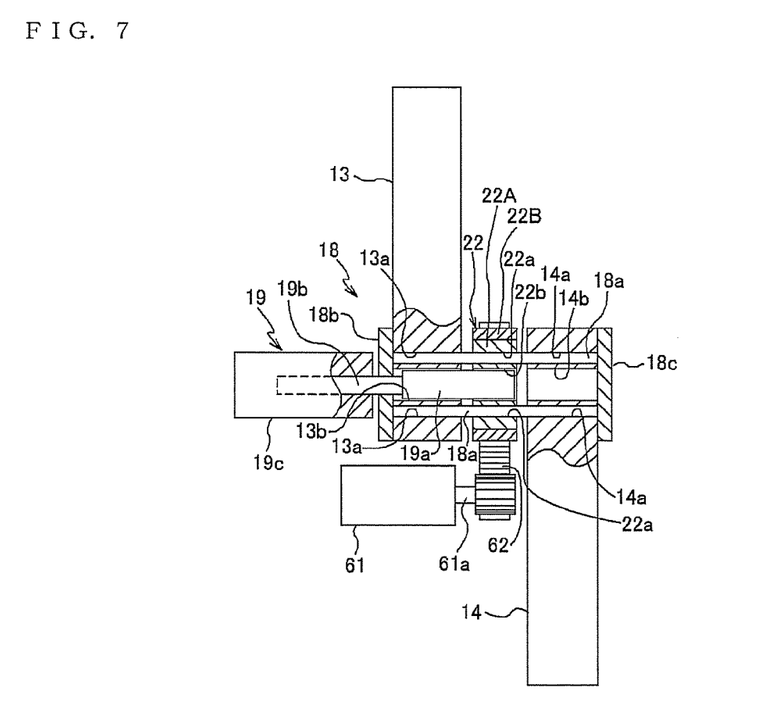
FIG. 7 is a ground section view showing the part of the lower joint in the support arm with a motor for fine tuning the angle of the offset link to the first upper link and the second lower link.

As shown in FIG. 7, the motor 61 is disposed in the lower joint 18. The rotation angle of the link 22 to the link 13 or 14 can be fine tuned by the motor 61.

In detail, the link 22 includes an inner link 22A and an outer link 22B, the link 22B is arranged in the outside of the link 22A, and the link 22B supports the holder 20.

The link 22A and 22B can rotate to the rotation axis of the joint relatively.

The link 22B has a pulley peripheral, and a driving belt 62 is looped over the link 22B and the driving shaft of the motor 61 rotating the link 22B.

The holes 22a and 22b are formed in the link 22A connected to the link 13 and 14.

The rotation angle θ1 and θ2 of the link 22A to the link 13 and 14 are respectively fixed by the piston 19a.

The main body of the motor 61 is fixed in the side of the link 22A.

The other members including the links 13, 14 and the plunger 19 are the same as the above described structure, so that they are not described again.

Due to the above structure, for example as shown in FIG. 2, when the rotation angle θ1 of the links 13 and 22 is fixed and the window 5 is assemble to the rear window frame 7a, the arm 10 is extended by the vertical length and the window 5 is moved down and moved to the height of the rear window frame 7a. If the inclination of the rear window 7a differs a little from that of window 5, the link 22B is rotated to the link 22A by the motor 61, the inclination of the window 5 is fine tuned and the inclination of the window 5 can be adjusted to that of the rear window frame 7a.

The rotation angle θ1 of the inner link 22A to the link 13 is fixed, but the link 22B is rotated to the link 22A by the motor 61, the posture of the holder 20 (window 5) against the link 13 is fine tuned.

Thus, the accuracy for tuning the posture of the window 5 and the quality for assembling the window 5 to the rear window frame 7a can be improved.

The work conveying apparatus 1 can be constructed as following.

Figure 8:
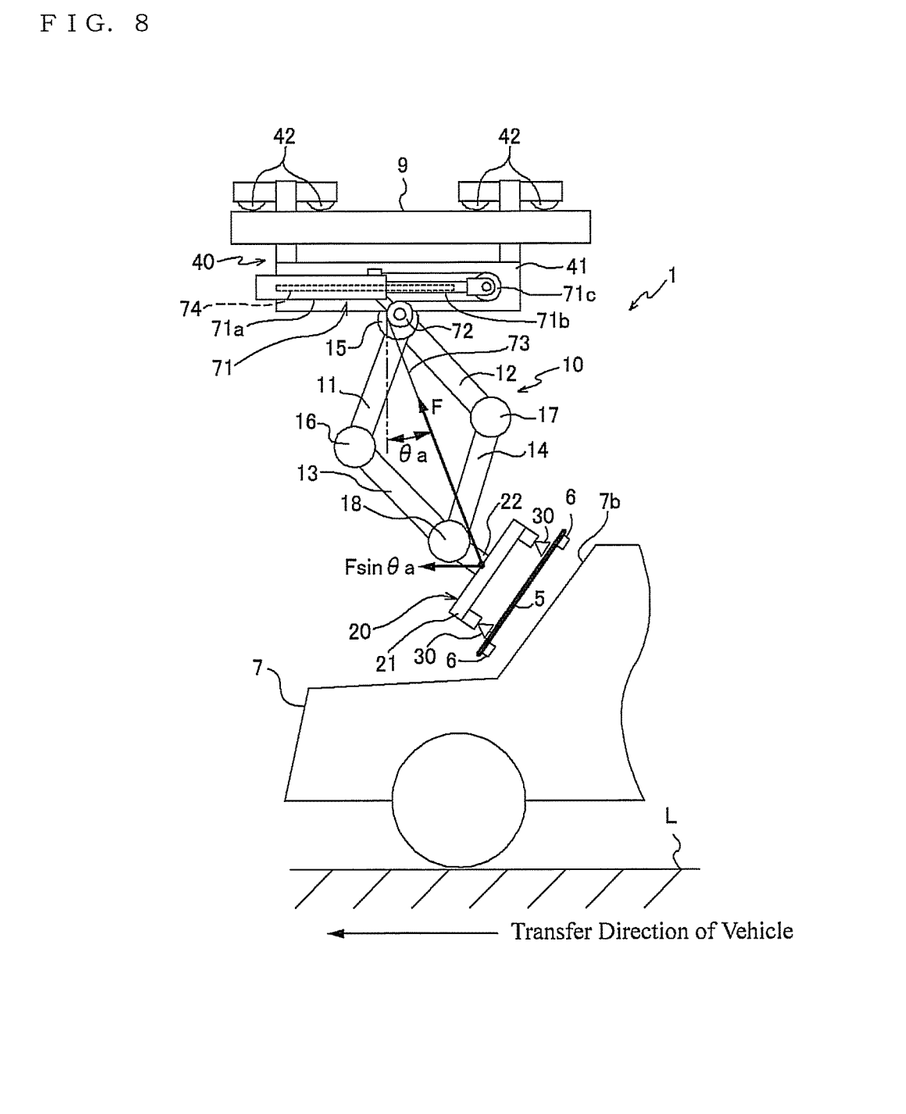
FIG. 8 is a side view showing the work conveying apparatus in the state that the vertical force works the holder by a wire of a balancer structure, which supports the gravity of the holder and the window and cancels the gravity working the support arm.

As shown in FIG. 8, the work conveying apparatus 1 includes a balancer-structure as following. A wire 73 is suspended between the trolley 40 and the holder 20, supports the weight of the holder 20 and the window 5, so that the arm 10 is not effected the load involving the weight during moving and that the load for the motor is reduced which is set in the joint 15 of the arm 10.

One end of the wire 73 is connected to the body 41 of the trolley 40, the other end is connected to the holder 20.

A balancer cylinder 71 is set to the body 41. The cylinder 71 includes a cylinder body 71a, a piston 71b and a pulley 71c; the piston 71b can move against the body 71a, the pulley 71c is set at the end of the piston 71b. The piston 71b can move to the substantially horizontal direction.

Another pulley 72 is also set to the body 41, the wire 73 is looped over the pulley 71c and 72.

The piston 71b of the cylinder 71 is moved, then the length of the wire 73 between the pulley 72 and the holder 20 is changed which is looped over the pulley 71c and 72. Thus, the length of the wire 73 is changed in accordance with moving the window 5 by the arm 10, so that the weight for the arm 10 is effectively reduced (canceled), in spite of the movement of the arm 10 (the window 5 is moved up by the arm 10 shortened by vertical length or the window 5 is moved down by the arm 10 extended by vertical length).

In the balancer-structure, if the position of the cylinder 71 and the pulley 72 in the direction to the assembly line L is fixed, as shown in FIG. 8, depending on the position of the end of arm 10 (or the holder 20) in the direction of the assembly line L, the looped part of the wire 73 over the pulley 72 may be out of the connect part of the holder 20 with respect to the position in the direction of the assembly line L.

In other words, the wire 73 under the pulley 72 supports the holder 20 and the window 5 at an inclined angle θa to the vertical down.

In this position, the load F works on the wire 73 along the wire 73 which is connected to the holder 20, the wire 73 inclines at angle θa to the vertical direction, and the horizontal component of the load [Fsinθa] works on the joint which the wire 73 connected to the holder 20.

Thus, when the window 5 is set to the front window frame 7b, if the horizontal component [Fsinθa] works on the holder 20, the operation force can not be reflected to the device 80 which the operator controls the holder 20, therefore, the control of the arm 10 and the like can not be stabilized.

Then, the work conveying apparatus 1 is constructed that the cylinder 71 is set to the body 41 moving along the direction of the assembly line L, and that the horizontal component [Fsinθa] cannot work on the holder 20 in spite of the moving (posture) of the arm 10.

The cylinder 71 and the pulley 72 is set to the body 41 through the slide member including a guide rail 74 and the like, when the horizontal force works on the wire 73 under the pulley 72, the cylinder 71 and the pulley 72 move together to the direction canceling the force.

Figure 9:
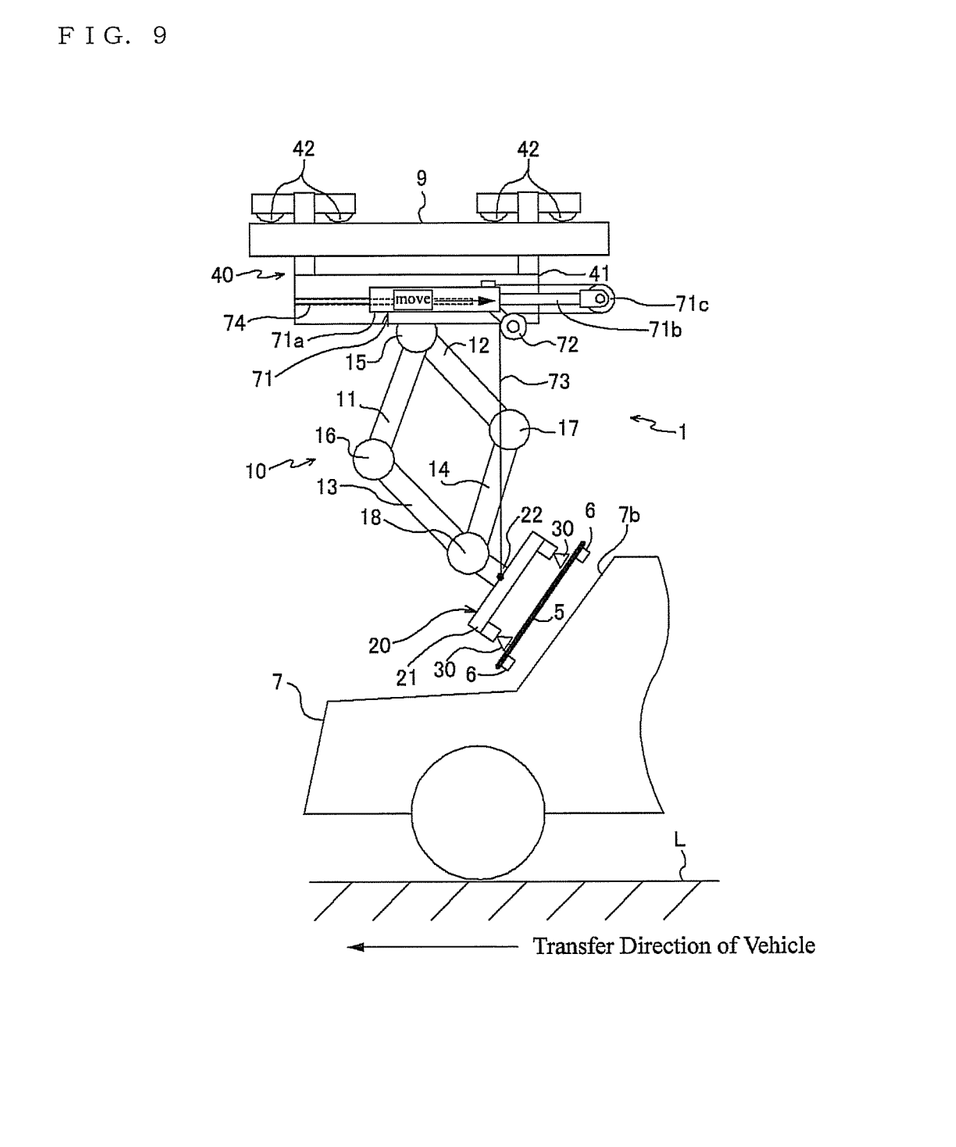
FIG. 9 is a side view showing the work conveying apparatus in the state that the vertical force does not work the holder by the wire of the balancer structure, which supports the gravity of the holder and the window and cancels the gravity working the support arm.

Due to the above construction, as shown in FIG. 8, if the wire 73 is inclined to the vertical direction and the horizontal component [Fsinθa] works on the holder 20, as shown FIG. 9, the cylinder 71 moves to the direction canceling the horizontal component [Fsinθa], so that the horizontal component [Fsinθa] cannot work on the holder 20.

Furthermore, in this case, the cylinder 71 moves to the position where the wire 73 extends from the pulley 72 to the vertical down.

Thus, in spite of the posture of the arm 10, the pulley 72 is set over the joint which the wire is connected to the holder 20, so that the wire 73 can be suspended vertically and the horizontal force is prevented from working on the holder 20, therefore, the holder 20 can be conveyed and controlled stably.

INDUSTRIAL APPLICABILITY

The present invention is applicable in the industrial instrument as the work conveying apparatus, holding a work, conveying the work to an assembled position, and changing the posture of the work applied to the assembled position.

The invention claimed is:

1. A work conveying apparatus, holding a work, conveying the work to a work-assembly position, and changing a posture of the work in accordance with the work-assembly position, the apparatus comprising:
  a holder for holding the work; and
  a support arm for supporting and conveying the holder to the work-assembly position,
  wherein the support arm is constructed as a quadrate closed loop link mechanism, the support arm comprising a first upper link, a second upper link, a first lower link and a second lower link, ends of the first upper link and the second upper link being connected by an upper joint, ends of the first lower link and the second lower link being connected by a lower joint, ends of the first upper link and the first lower link being connected to a first middle joint, and ends of the second upper link and the second lower link being connected to a second middle joint, wherein the lower joint connects the first lower link, the second lower link and the holder rotatably, the lower joint comprising a connect member connected between the lower links and the holder for connecting selectively the holder to either one of the lower links without relative rotation for fixing the posture of that link and the holder.

2. The work conveying apparatus as set forth in claim 1, the holder, comprising:

an offset link connected to the lower joint; and a drive member for fine turning an angle between the offset link and either one of the lower links.

* * * * *

UNITED STATES PATENT AND TRADEMARK OFFICE
CERTIFICATE OF CORRECTION

PATENT NO.        : 8,419,338 B2                                          Page 1 of 1
APPLICATION NO.   : 12/665212
DATED             : April 16, 2013
INVENTOR(S)       : Konosu et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 672 days.

Signed and Sealed this
First Day of September, 2015

Michelle K. Lee
*Director of the United States Patent and Trademark Office*